(No Model.)
J. L. WALZ.
DEVICE FOR CATCHING POULTRY.
No. 400,277. Patented Mar. 26, 1889.
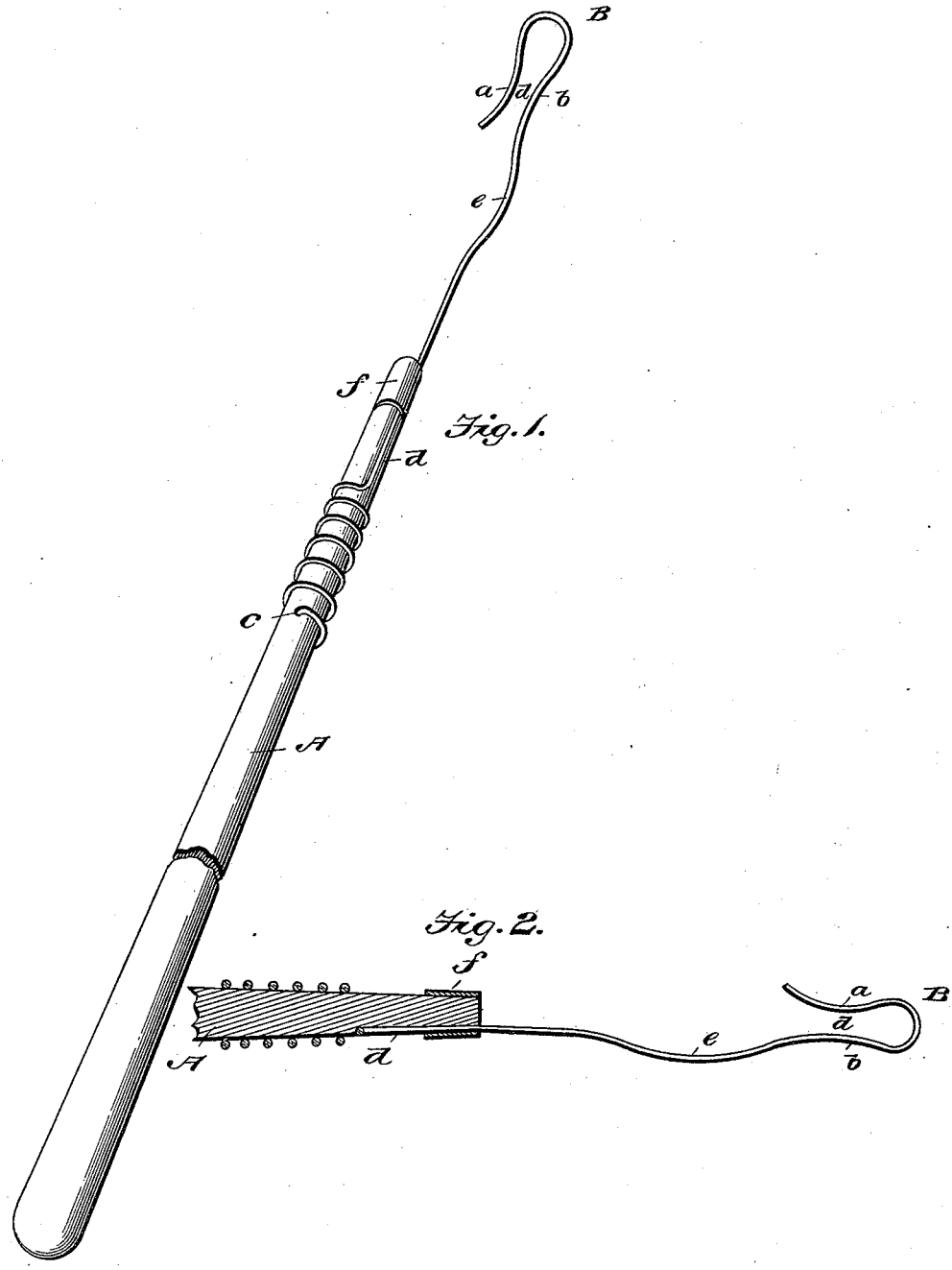

UNITED STATES PATENT OFFICE.

JACOB LEE WALZ, OF LYNCHBURG, VIRGINIA.

DEVICE FOR CATCHING POULTRY.

SPECIFICATION forming part of Letters Patent No. 400,277, dated March 26, 1889.

Application filed January 23, 1889. Serial No. 297,244. (No model.)

*To all whom it may concern:*

Be it known that I, JACOB LEE WALZ, a citizen of the United States, residing at Lynchburg, in the county of Campbell and State of Virginia, have invented certain new and useful Improvements in Chicken-Catchers; and I do declare the following to be a full, clear, and exact description of the invention, such as will enable others skilled in the art to which it appertains to make and use the same.

My invention relates to means for catching fowls and poultry; and it consists in the novel construction of a light wooden handle united to a wire extension that has a hook at its extreme end, substantially as hereinafter specified and claimed.

The invention will be fully understood from the following description and claims, when taken in connection with the accompanying drawings, in which—

Figure 1 is a perspective view of my device, showing the handle broken. Fig. 2 is a longitudinal sectional view of the same.

Referring to the said drawings by letter, A indicates a wooden handle, preferably about seven feet in length and tapering in shape. At the small end of this handle I attach a wire about two feet in length. This wire is provided with a hook at its extreme end, as shown, and is indicated by the letter B on the drawings.

The connection between the handle and wire is made in the manner following: I form a small opening or hole in the side of the handle at the point marked *c* and force the upper end of the wire B therein. I then wrap or wind the wire around the handle, as represented, and finally pass it downward in a horizontal position and secure it in place in a groove (marked *d*) by a ring or band (marked *f*) that clasps the small end of the handle and the wire. The hook B is of a peculiar shape, having the free end or terminal branch bent inwardly, as shown at *a*, and the opposite branch of the hook is bent in a similar manner, as shown at *b*. By this construction it will be seen that the hook or loop has a contracted entrance, as shown at *d*, whereby the leg of a fowl may be prevented from ready disengagement and firmly held in the hook until removed by the operator. The wire adjacent to the hook has an outward bend, as shown at *e*, so as to adapt the hook to more readily engage the leg of a fowl.

Having described my invention, what I claim is—

1. The device for poultry-catching described, consisting of the wooden handle A and wire extension B, united by attaching one end of the wire to the handle, winding it around the same, and finally securing it in a groove in said handle by a band, *f*, substantially as specified.

2. An improved article of manufacture, consisting of a handle, the wire secured thereto, as shown, and having at its outer end a hook with inward bends *a b*, to form a contracted entrance, and also a bend, *e*, adjacent to the hook, substantially as specified.

In testimony whereof I affix my signature in presence of two witnesses.

JACOB LEE WALZ.

Witnesses:
JOS. H. JONES,
C. G. SEARS.